(12) United States Patent
Lilko et al.

(10) Patent No.: US 12,111,844 B2
(45) Date of Patent: Oct. 8, 2024

(54) SYSTEM AND METHOD FOR CLOUD-BASED REPLICATION OF DATA

(71) Applicant: Open Text SA ULC, Halifax (CA)

(72) Inventors: Alexander Lilko, Maple (CA); Paul O'Hagan, Ontario (CA)

(73) Assignee: OPEN TEXT SA ULC, Halifax (CA)

( * ) Notice: Subject to any disclaimer, the term of this patent is extended or adjusted under 35 U.S.C. 154(b) by 34 days.

(21) Appl. No.: 17/882,402

(22) Filed: Aug. 5, 2022

(65) Prior Publication Data

US 2024/0045884 A1    Feb. 8, 2024

(51) Int. Cl.
*G06F 16/27* (2019.01)
*G06F 16/22* (2019.01)

(52) U.S. Cl.
CPC ........ *G06F 16/273* (2019.01); *G06F 16/2282* (2019.01)

(58) Field of Classification Search
CPC .................................................... G06F 16/273
USPC ......................................................... 707/637
See application file for complete search history.

(56) References Cited

U.S. PATENT DOCUMENTS

| | | | |
|---|---|---|---|
| 9,509,641 B1* | 11/2016 | Li | H04L 49/90 |
| 10,936,551 B1* | 3/2021 | Unger | G06F 16/113 |
| 2013/0019242 A1* | 1/2013 | Chen | H04L 43/50 |
| | | | 718/1 |
| 2016/0267155 A1* | 9/2016 | Liu | G06F 16/2282 |
| 2018/0107561 A1* | 4/2018 | Bender | G06F 16/182 |
| 2018/0329966 A1* | 11/2018 | Ranganathan | G06F 12/1009 |
| 2020/0201775 A1* | 6/2020 | Zhang | G06F 12/0822 |
| 2021/0089552 A1* | 3/2021 | Karl | G06F 16/2455 |

* cited by examiner

*Primary Examiner* — Muluemebet Gurmu
(74) *Attorney, Agent, or Firm* — Sprinkle IP Law Group

(57) ABSTRACT

Embodiments provide systems, methods and computer program products for cloud replication of data. One embodiment includes, accessing a virtual table definition and a data collection definition, the virtual table definition comprising a definition of a set of virtual table fields and a mapping of the set of virtual table fields to a set of target data types; automatically creating a virtual table according to the virtual table definition, the virtual table comprising the set of virtual table fields populated with the data of interest according to the data collection definition; and sending the virtual table and the mapping to a cloud computing environment. One embodiment further includes, in the cloud computing environment, storing the set of virtual table fields as a set of physical table fields in a physical table in a cloud hosted database, the set of physical table fields having the set of target data types.

22 Claims, 8 Drawing Sheets

SYSTEM AND METHOD FOR CLOUD-BASED REPLICATION OF DATA

TECHNICAL FIELD

This disclosure relates to the field of storing data to a cloud-based environment. Even more particularly, embodiments relate storing data to a cloud computing environment using virtual tables.

BACKGROUND

The challenge of managing data within an enterprise is growing increasingly complex. Many organizations employ on-premises ("on-prem") software applications—that is, software that runs on the computers on the premises of the organization and typically behind the organization's firewall, rather than at a remote system—that are essential to the daily processes of the organization. Moreover, organizations are increasingly using cloud-based services to store data for disaster recovery and leverage additional data analysis capabilities provided by the cloud-based services.

Replicating data from an on-prem environment, particularly when the on-prem environment includes heterogeneous data sources having different formats and data storage schemas, is a difficult, time consuming and resource intensive task. While some systems offer extract-transform-load (ETL) into the cloud, which perform traditional ETL functions of extracting data from a data source (extract), mapping attributes from a source database to a target database (e.g., changing column names from those of the source database to those used in a data warehouse) (transform) and then loading the transformed database into a target data warehouse (load), such ETL solutions require that the definition of the ETL pipeline implemented at the on-prem environment include extensive knowledge of the cloud environment's existing database structure. More particularly, the database structure into which data is transformed on-prem must match a pre-existing schema in the cloud hosted data warehouse.

SUMMARY

Embodiments of the present disclosure provide mechanisms to replicate or otherwise provide data from a first computing environment, such as an on-prem environment or other environment, to a cloud computing environment.

According to one aspect of the present disclosure, a method for cloud replication of data is provided. The method comprises, at the first computing environment: accessing a virtual table definition and a data collection definition, the virtual table definition comprising a definition of a set of virtual table fields and a mapping of the set of virtual table fields to a set of target data types, and the data collection definition defining data, including fields and rows or unstructured content of interest; automatically creating a virtual table according to the virtual table definition, the virtual table comprising the set of virtual table fields populated with the data of interest according to the data collection definition; and sending the virtual table and the mapping of the set of virtual table fields to target data types over an internet from the first computing environment to a cloud computing environment. The method may further include storing, in the cloud computing environment, the set of virtual table fields as a set of physical table fields in a physical table in a cloud hosted database of the cloud computing environment, the set of physical table fields having the set of target data types.

Another embodiment comprises a data replication system for replicating data to a cloud. The data replication system comprises an on-premises computer system connected to the internet, a cloud computer system connected to the internet, and a cloud hosted database. The on-premises computer system comprises a first computer processor and a first non-transitory computer readable storage medium storing a set of on-premises computer instructions executable by the first computer processor. The set of on-premises computer instructions includes instructions for: accessing a virtual table definition and a data collection definition, the virtual table definition comprising a definition of a set of virtual table fields and a mapping of the set of virtual table fields to a set of target data types, and the data collection definition defining data of interest; automatically creating a virtual table according to the virtual table definition, the virtual table comprising the set of virtual table fields populated with the data of interest; and sending the virtual table and the mapping of the set of virtual table fields to target data types over the internet.

The cloud computer system is connected to the internet and the cloud hosted database and comprises a second computer processor and a second non-transitory computer readable storage medium storing a set of cloud computer instructions executable by the second computer processor. The set of cloud computer instructions comprises instructions for receiving the virtual table over the internet and storing the set of virtual table fields as a set of physical table fields in a physical table in the cloud hosted database, the set of physical table fields having the set of target data types.

Another embodiment includes a computer program product comprising a non-transitory, computer-readable medium storing thereon a set of on-premises computer instructions executable by a processor. The set of on-premises computer instructions comprises instructions for: accessing a virtual table definition and a data collection definition, the virtual table definition comprising a definition of a set of virtual table fields and a mapping of the set of virtual table fields to a set of target data types, and the data collection definition defining data of interest; automatically creating a virtual table according to the virtual table definition, the virtual table comprising the set of virtual table fields populated with the data of interest according to the data collection definition; and sending the virtual table and the mapping of the set of virtual table fields to target data types over an internet to a cloud computing environment for storage of the set of virtual table fields as a set of physical table fields having the set of target data types in a cloud hosted database.

Thus, various embodiments can include storing data from on-prem to a cloud hosted database. In some embodiments, the cloud hosted database is a staging database for a cloud service.

Moreover, some embodiments include collecting data from a number of sources. As such, the data of interest comprises data from a plurality of heterogeneous data sources transformed by a transformation engine.

The virtual may be used to store a variety of data including, but not limited to, metadata and files. For example, the virtual table may comprise a first virtual table field for holding a character string representing metadata of a respective file and a second virtual table field for holding the respective file as a binary string.

As noted above, embodiments can include sending the virtual table to a cloud computer system over the internet. According to one embodiment, sending the virtual table over the internet comprises sending a text-based representation of the virtual table and the mapping of the set of virtual table fields to the set of target data types to the cloud computer system.

In some cases, the format of the virtual table and the cloud hosted database have different valid data types. For example, the virtual table may include a first virtual table field that has a first virtual field data type that is a valid data field type for the format used for the virtual table but maps to a target data type that is not a valid data type. Mapping the set of virtual table fields to the set of target data types can include, for example, mapping the first virtual table field to a first target data type, where the first target data type is a valid data type of the cloud hosted database. The first virtual table field is stored to the physical table as a first physical table field having the first target data type.

Some embodiments include performing and, in some cases repeating, a set of operations to store the virtual table in the cloud hosted database as the physical table. The set of operations may comprise, for example, receiving a portion of the virtual table at the cloud computing environment; storing the portion of the virtual table in a persistent storage location in the cloud computing environment; producing a message to a message queue in the cloud computing environment, the message including a reference to the portion of the virtual table stored at the persistent storage location; consuming the message from the message queue; based on the message consumed from the message queue, retrieving the portion of the virtual table from the persistent storage location; and storing the portion of the virtual table as a portion of the physical table.

Some embodiments perform bi-directional replication.

Embodiments provide an advantage over prior solutions by loading data into a virtual table that does not have to match a pre-existing schema in the cloud hosted database or at a data source from which data is collected. Instead, the virtual table can be used to dynamically create new tables at the cloud hosted environment. As such, embodiments can allow for a flexible and dynamic ETL or replication solution that allows for new tables to be easily created as needed to meet the needs of an organization.

Further, embodiments provide an advantage by providing a mechanism that supports transforming metadata and content as part of the transformation process or pipeline.

Embodiments further provide an advantage by utilizing a data structure to replicate data to a cloud environment that can treat replicating content and replicating metadata as the same type of transaction that can be processed using the same pipeline.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions, and/or rearrangements within the spirit and/or scope of the underlying inventive concept will become apparent to those skilled in the art from this disclosure.

Figure 1:
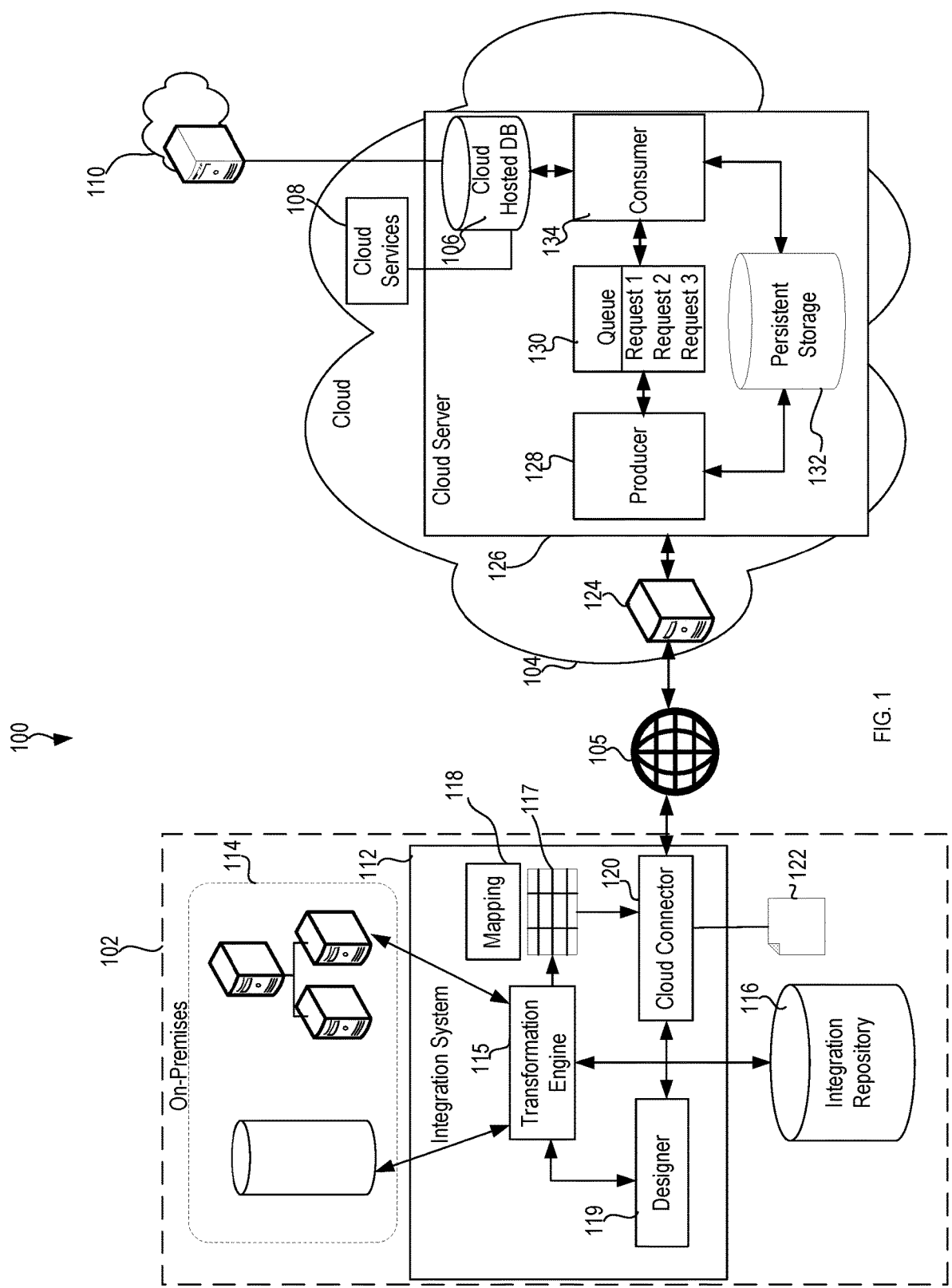
FIG. 1 is a diagrammatic representation of one embodiment of a data integration and replication system.

FIG. 1 is a diagrammatic representation of one embodiment of a data integration and replication system 100 that includes an on-premises (on-prem) environment 102 coupled to a cloud environment 104 over the internet 105. On-prem environment 102 includes computer systems, software, and data storage on the premises of an organization—for example, the computer systems, software and data storage of an enterprise on the enterprise's premises. Cloud environment 104 includes a cloud hosted database 106 to which data from on-prem environment 102 is replicated. The data from cloud hosted database 106 may be accessed and used by a variety of cloud services, including cloud services 108 hosted in cloud environment 104 or services by other cloud environments, such as third-party cloud services 110 provided by a third-party cloud environment. Thus, in some embodiments, cloud hosted database 106 may act as a staging database for cloud services.

On-prem environment 102 includes an integration system 112 to access and integrate information from a number of heterogeneous data sources 114. To this end, integration system 112 includes web services connectors, application programming interface (API) connectors, mainframe connectors, database adapters (e.g., ODBC or native database drivers), text/xml connectors, or other types of connectors to connect to and access data from data sources 114. Examples of data sources 114 include, but are not limited to, Customer Relationship Management (CRM) applications, Enterprise Resource Planning (ERP) applications, Supply Chain Management (SCM) applications, mainframes and databases. Further, web services connectors allow integration system 112 to access and integrate data provided by various web services. Thus, integration system 112 can collect and integrate data from many data sources such as data from database tables and documents and metadata from enterprise content management systems.

Integration system 112 can provide a variety of features such as, but not limited to integrating content from various repositories and web-based resources. More particularly, integration system 112 provides ETL functionality to transform and direct information across a number of systems and applications. Unlike many ETL solutions, which do not transform content, integration system 112 includes the capability to transform both metadata and content in some embodiments.

According to one embodiment, integration system 112 has a hub-and-spoke design that includes a centralized transformation engine 115 and a metadata repository 116 (the hub) that exchange data among data sources and targets (the spokes). Transformation engine 115 brokers information from sources to targets. In operation, integration system 112 extracts data from data sources 114, transforms it using the transformation engine 115, and loads it into a table. Even more particularly, in the example of FIG. 1, transformation engine 115 loads the data into a virtual table 117. Metadata repository 116 contains all metadata used by data integration and replication processes. More particularly metadata repository 116 stores and manages all aspects of data transformation and exchange process metadata. Technical metadata (such as data structures and transformation rules), business metadata (such as business rules and data flows), and production metadata (such as programs and logs) are stored in metadata repository 116.

Virtual table 117 is used to create a table in cloud hosted database 106. According to some embodiments, however, virtual table 117, is not in the table format used by the database management system of cloud hosted database 106, but is formatted according to an easily transportable format, such as JSON or XML. For example, in one embodiment, cloud hosted database 106 is a PostgreSQL database and virtual table 117 is a JSON representation of a table. PostgreSQL and JSON are simply provided as one example of one type of database and one format that may be used, but other types of databases or formats for exchanging data may be used in other embodiments.

Virtual table 117 comprises a schema (e.g., name, field names, field data types, primary key, foreign key) and table records according to the schema. In general, the schema defines a table structure and the virtual table records hold the data to be stored in records (e.g., as rows) in a physical table of cloud hosted database 106.

In some cases, virtual table 117 is embodied in a format that does not support the same data types as cloud hosted database 106. For example, cloud hosted database 106 may have a set of valid data types, but one or more fields of the virtual table may be of a data type that is not in the set of valid data types of cloud hosted database 106. Therefore, when storing data from virtual table 117 to cloud hosted database 106, it may be desirable to store the data as a valid data type of cloud hosted database. To this end, virtual table 117 includes an associated mapping 118 to valid data types of the cloud hosted database. This mapping 118 can be used to account for the fact that virtual table 117 and cloud hosted database 106 may support different data types. For example, in an embodiment in which cloud hosted database 106 is a PostgreSQL database and virtual table 117 is instantiated using JSON, the mapping 118 may define the PostgreSQL numeric type to use at cloud hosted database 106 for a physical table field corresponding to a number type virtual table field. As another example, the mapping 118 may specify a character type, a binary type, or a large object of a PostgreSQL database to use at cloud hosted database 106 for a physical table field corresponding to a string type virtual table field. Mapping 118 may also be embodied in JSON, XML or another easily transported format, including as part of the same document as virtual table 117. Thus, virtual table 117 and mapping 118 are sent, in some embodiments, to cloud environment 104 as a text-based representation.

Designer 119 is a graphical environment for designing data transformation and exchange processes. Data structures can be imported directly from source and target systems or using metadata bridges. User-defined business rules, functions, and procedures created in designer 119 are stored as objects within the metadata repository 116. Designer 119 also incorporates a graphical interface that provides a graphical procedural scripting environment for designing data integration and replication processes of any complexity.

Designer 119 allows a user to define an integration process for extracting, transforming, and loading source data to virtual table 117. The integration process design includes a virtual table definition and a data collection definition. The virtual table definition defines the table schema (table structure), such as a table name, field names for the virtual table fields, data types of the virtual fields, designations of keys and a mapping of the set of virtual table fields to a set of target data types. It can be noted that the virtual table schema may be defined based on a business requirement and does not have to fit a pre-existing schema in cloud hosted database 106 or of the on-prem data at data sources 114. Further, virtual table 117 can be dynamic in that its schema can change depending on the integration process being run.

As discussed above, the integration process design includes a data collection definition. The data collection definition specifies the data to be collected and transformed into the fields of the virtual table. In other words, the data collection definition defines the data of interest to be included in virtual table 117. For example, the data collection definition can specify the column data or cells to collect from various databases, the files and metadata to collect from enterprise content management systems, or other types of data to collect from data sources 114. The data specified for collection can include data from heterogeneous data sources 114. The data collection definition may further define transformations to occur (e.g., data to be combined, operations to be applied to collected data, or other transformations). Transformation engine 115 collects the specified data, performs the transformations specified and further transforms each item of data to be stored in a field of virtual table to the data type for that field. In some cases then, the data of interest included in virtual table 117 may include data from a plurality of heterogeneous data sources transformed by transformation engine 115.

According to one embodiment, when an integration process involves sending files from on-prem environment 102 to cloud environment 104, transformation engine 115 stores the files as binary strings in virtual table 117. Using the example in which virtual table 117 is implemented in JSON, transformation engine 115, according to one embodiment, stores files as strings in a field having the string data type. Thus, for example, virtual table 117 may include fields for holding character string data representing the metadata of a file (e.g., content management metadata collected from an ECM system) and a field for holding the respective file as a binary string. In another embodiment, transformation engine 115 stores a pointer to the file in virtual table 117 so that cloud environment 104 can fetch the file.

Integration system 112 further includes a cloud connector 120 to connect to cloud environment 104. Cloud connector 120 sends virtual table information, such as the table schema and mapping to target data types, and virtual table records to cloud environment 104. Cloud connector 120 can include certificates 122 or other information necessary to connect to and authenticate with cloud environment 104.

Cloud environment 104 includes an API gateway 124 to accept API calls, aggregate assorted services required to fulfill them, and return the appropriate result. Cloud environment 104 further comprises a cloud server 126 providing services to host data replicated or otherwise received from on-prem environment 102. In the embodiment illustrated, cloud server 126 includes a message producer 128, a message queue 130, persistent storage 132, a message consumer 134 and cloud hosted database 106.

In operation, producer 128 receives calls from cloud connector 120 that include information about virtual table 117 or virtual table records. Producer 128 writes the virtual table information and virtual table records to persistent storage 132 and adds messages to message queue 130 that reference the stored virtual table information and records. Consumer 134 ingests the messages from message queue 130, creates a physical table in cloud hosted database 106 that corresponds to virtual table 117 and adds the records to the physical table. Cloud services 108 and third-party cloud services 110 can import the data from cloud hosted database 106.

In some embodiments, replication may be bidirectional. In one such embodiment, integration system 112 sends a request for data from a physical table in cloud hosted database 106. Producer 128 receives the request and adds a request to message queue 130. Consumer 134 consumes the request from the message queue 130, collects the requested table from cloud hosted database 106 and sends the data to integration system 112.

Figure 2:
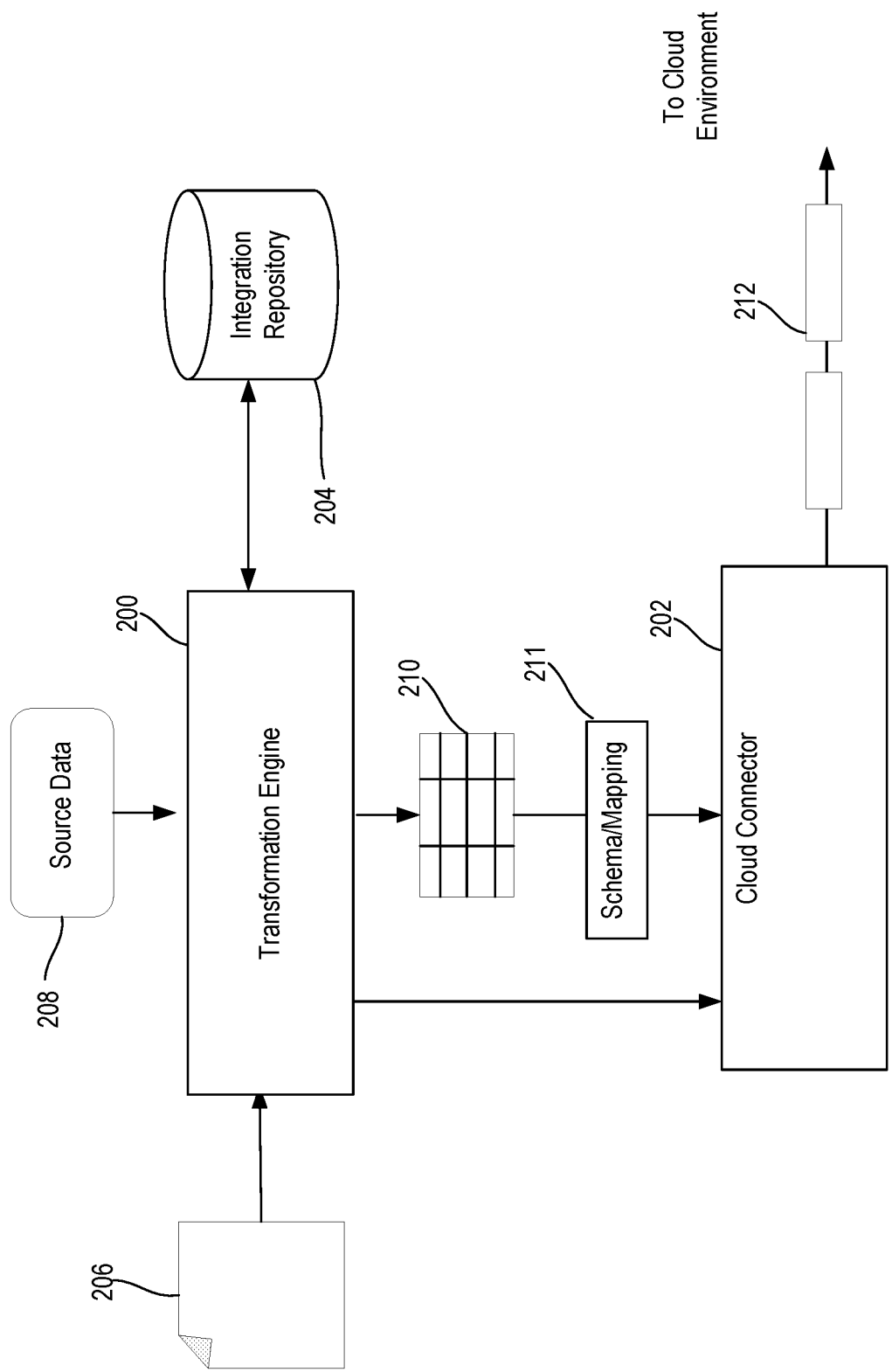
FIG. 2 is a diagrammatic representation of one embodiment of preparing data and sending data to a cloud environment.

FIG. 2 is a block diagram illustrating one embodiment of a data integration and replication system executing an integration process, such as to replicate on-prem data to a cloud environment. In the embodiment of FIG. 2, the data integration and replication system includes a transformation engine 200, a cloud connector 202, and a metadata repository 204. In operation, transformation engine 200 processes a replication definition 206 to collect, transform and load source data 208 into a virtual table 210. Metadata repository 204 contains the metadata used by the data integration and replication processes.

Replication definition 206 includes a virtual table definition that defines the table schema, such as a table name, field names for the virtual table fields, data types of the virtual fields and includes a mapping of the set of virtual table fields to a set of target data types. As transformation engine 200 processes replication definition 206, transformation engine 200 signals the cloud connector 202 and passes virtual table 210, including schema information and mapping information 211, to cloud connector 202, which connects to a target cloud environment and sends virtual table packages 212 to the cloud environment. In general, the initial virtual table package(s) 212 for a virtual table 210 for an integration process include the virtual table definition and potentially virtual table record data. As transformation engine 200 adds records to virtual table 210, cloud connector 202 continues to send virtual table packages 212 to the cloud environment. Cloud connector 202 is configured to package virtual table data based on the size of unsent data, timing, or according to other criteria.

Figure 3:
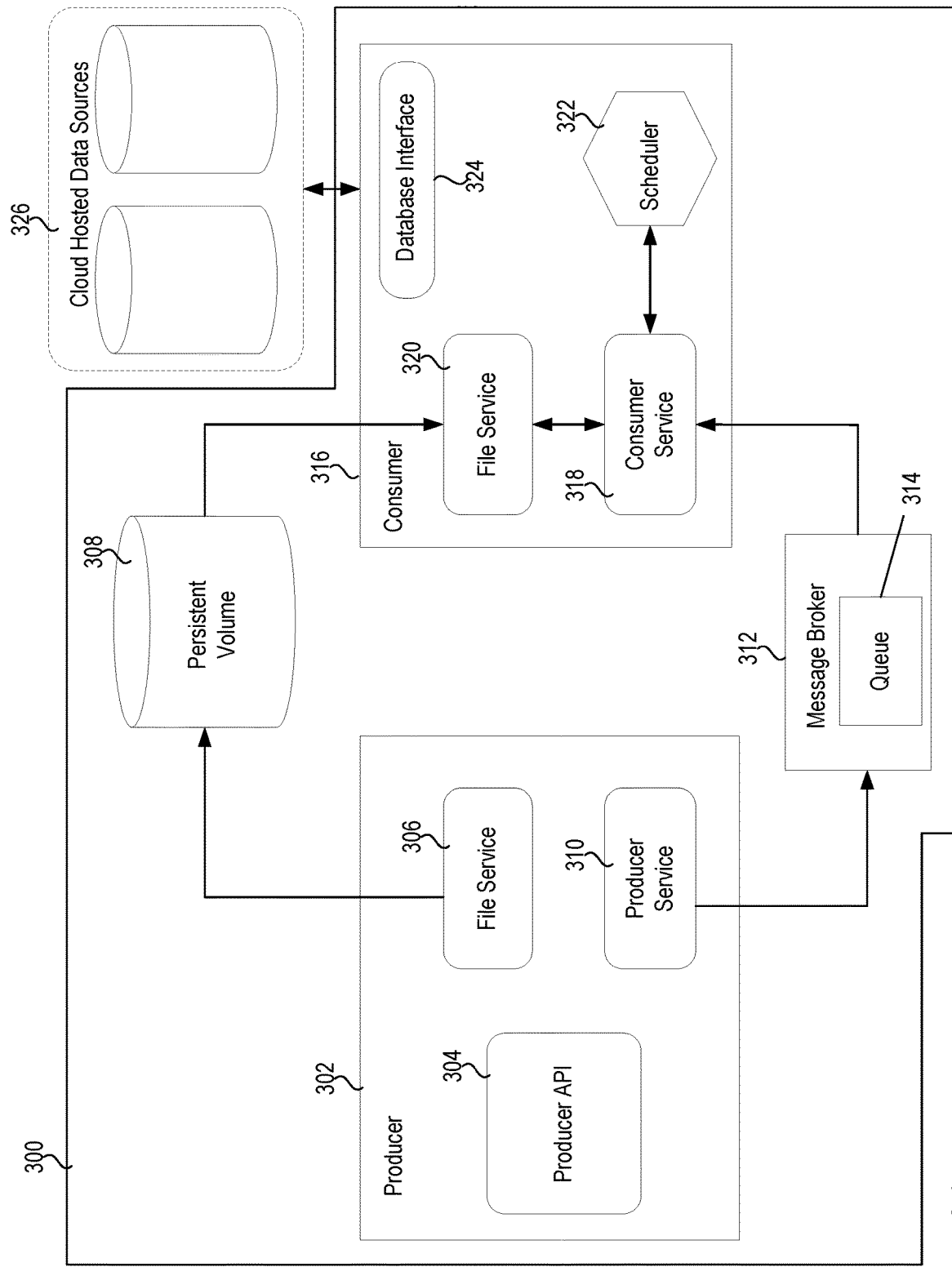
FIG. 3 is a diagrammatic representation of one embodiment of a cloud server.

FIG. 3 is a diagrammatic representation of one embodiment of a cloud server 300, which may be one example of cloud server 126. Cloud server 300 includes a message producer 302 that includes a producer API 304, a file service 306, and a producer service 310. Cloud server 300 further includes a persistent volume 308 and a message broker 312 that manages a message queue 314. Cloud server 300 also includes a message consumer that comprises a consumer service 318, a file service 320, a scheduler 322 and a database interface 324. Cloud server 300 further includes cloud hosted data sources 326, such as cloud hosted databases.

In operation, producer 302 receives requests to store data to the cloud. In an even more particular embodiment, producer 302 receives virtual table packages (e.g., virtual table packages 212) via producer API 304. File service 306 stores virtual table information (e.g., schema information, mapping of virtual table fields to target data types) and virtual table records from the virtual table packages in persistent volume 308 and passes a pointer to the data stored in persistent volume 308 to producer service 310. Producer service 310 produces messages to a message broker 312 that contain the pointers to the information in persistent volume 308. Message broker 312 stores the messages in a message queue 314.

Consumer service reads messages from message queue 314 based, for example, on a schedule managed by scheduler 322 and passes the pointers from the messages to file service 320, which retrieves the stored data referenced by the pointer. Consumer service 318 processes the information retrieved from persistent volume 308 and creates new tables or adds records to tables at cloud hosted data source 326 via database interface 324.

According to one embodiment, the virtual table or data associated with the virtual table indicates the source(s) of data in the virtual table. When data/data changes are persisted in persistent volume 308, they include a marker that indicates the source of that data or change. In other words, cloud server 300 tracks the source of each transaction (data source from which the transaction came). In some embodiments, the source information is also persisted to cloud hosted data sources 326 when records are written from persistent volume 308 to cloud hosted data source 326. As such, data and data changes can be replicated from data sources (e.g., data sources 114, data sources 208) to persistent volume 308 and cloud hosted data sources 326 and back again.

Figure 4:
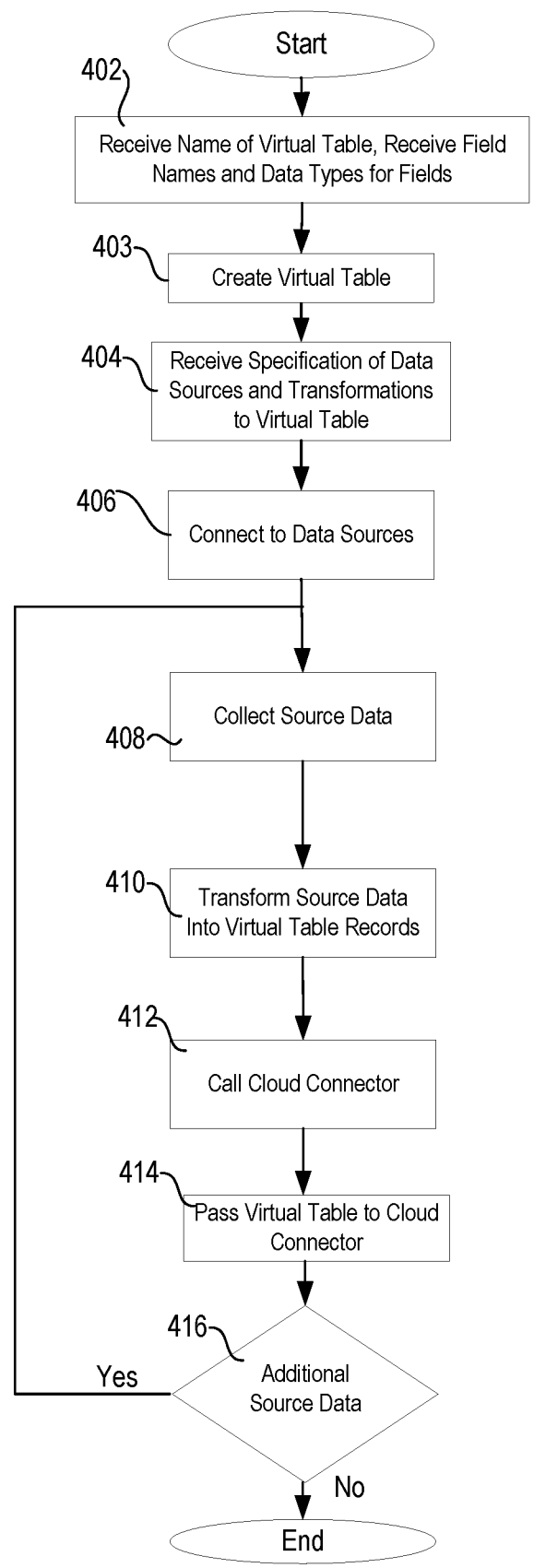
FIG. 4 is a flowchart illustrating one embodiment of a method preparing data to send from an on-prem environment to a cloud environment.

FIG. 4 is a flowchart illustrating one embodiment of a method for preparing data to send from an on-prem environment to a cloud environment. Steps may be implemented by an ETL system, such as, but limited to a data integration and replication system 100. Even more particularly, embodiments of FIG. 4 may be implemented by a transformation engine (e.g., transformation engine 115, transformation engine 200, or another transformation engine). In some embodiments, the method of FIG. 4 is embodied as computer executable instructions on a non-transitory, computer-readable medium.

The transformation engine receives a virtual table definition (step 402). For example, transformation engine 115 or transformation engine 200 may receive a replication definition that includes a virtual table definition. The virtual table definition defines a table schema (e.g., virtual table name, fields names, field data types) and a mapping of virtual table fields to target data types.

Using the virtual table definition, the transformation engine creates the virtual table (step 403). For example, transformation engine 115 creates virtual table 117 or transformation engine 200 creates virtual table 210.

The transformation engine further receives a specification of the sources, the data to collect from the data sources and the transformations to apply to the collected data is received (step 404). For example, the replication definition received by transformation engine 115 or transformation engine 200 may include a data collection definition that specifies the data to be collected and transformed into the fields of the virtual table and the transformations to apply. Accordingly, the transformation engine connects to the data sources (step 406), collects the source data (step 408), and transforms the source data into virtual table records (step 408). For example, transformation engine 115 or transformation engine 200 collects source data (e.g., data from data sources 114, source data 208), transforms the source data, and stores the transformed source data as records of virtual table 117 or virtual table 210.

The transformation engine calls the cloud connector (step 412) and passes the virtual table to the cloud connector (step 414). For example, transformation engine 115 calls cloud connector 120 and passes virtual table 117, including schema information and mapping 118, to cloud connector 120. As another example, transformation engine 200 calls cloud connector 202 and passes virtual table 210 (including schema and mapping information 211) to cloud connector 202.

If there is additional source data to be collected for an integration and replication process (e.g., as determined at step 416), the transformation engine repeats steps 408-414 to add additional records to the virtual table and passes the additional records to the cloud connector. Put another way, the transformation engine can continuously feed virtual table records to the cloud connector.

FIG. 4 is merely an illustrative example, and the disclosed subject matter is not limited to the ordering or number of steps illustrated. Embodiments may implement additional steps or alternative steps, omit steps, or repeat steps.

Figure 5:
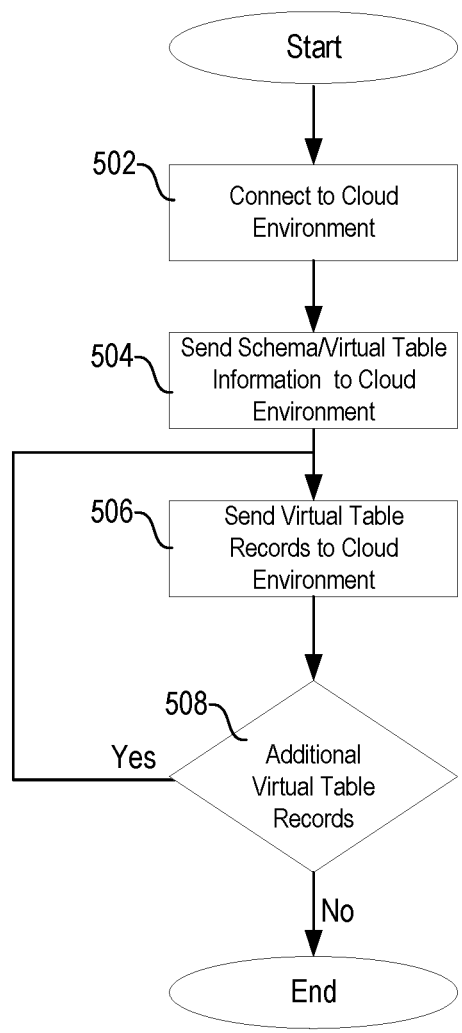
FIG. 5 is a flowchart illustrating one embodiment of a method for sending a virtual table to a cloud environment.

FIG. 5 is a flowchart illustrating one embodiment of a method for sending a virtual table to a cloud environment. In some embodiments, the method of FIG. 5 is implemented by an ETL system, such as, but limited to a data integration and replication system 100. Even more particularly, embodiments of FIG. 4 may be implemented by a cloud connector (e.g., cloud connector 120, cloud connector 202, or another cloud connector). In some embodiments, the method of FIG. 5 is embodied as computer executable instructions on a non-transitory, computer-readable medium.

The cloud connector, at step 502, connects to the cloud environment. For example, the cloud connector may connect to the cloud environment based on being called by the transformation engine at step 412. Connecting to the cloud environment can include providing certificates or other information to authenticate with the cloud environment.

The cloud connector, at step 504, sends the schema of the virtual table and other virtual table information, such as the mapping of virtual table fields to target data types, to the cloud environment. At step 506, the cloud connector sends the virtual table records to the cloud environment. The cloud connector can determine, at step 508, if additional records have been added to the virtual table. If so, the cloud connector repeats step 506 to send the virtual table records to the cloud environment. Thus, the cloud connector can continuously send virtual table records to the cloud environment. The steps of FIG. 5 can be repeated until the end of the virtual table is reached.

FIG. 5 is merely an illustrative example, and the disclosed subject matter is not limited to the ordering or number of steps illustrated. Embodiments may implement additional steps or alternative steps, omit steps, or repeat steps.

Figure 6:
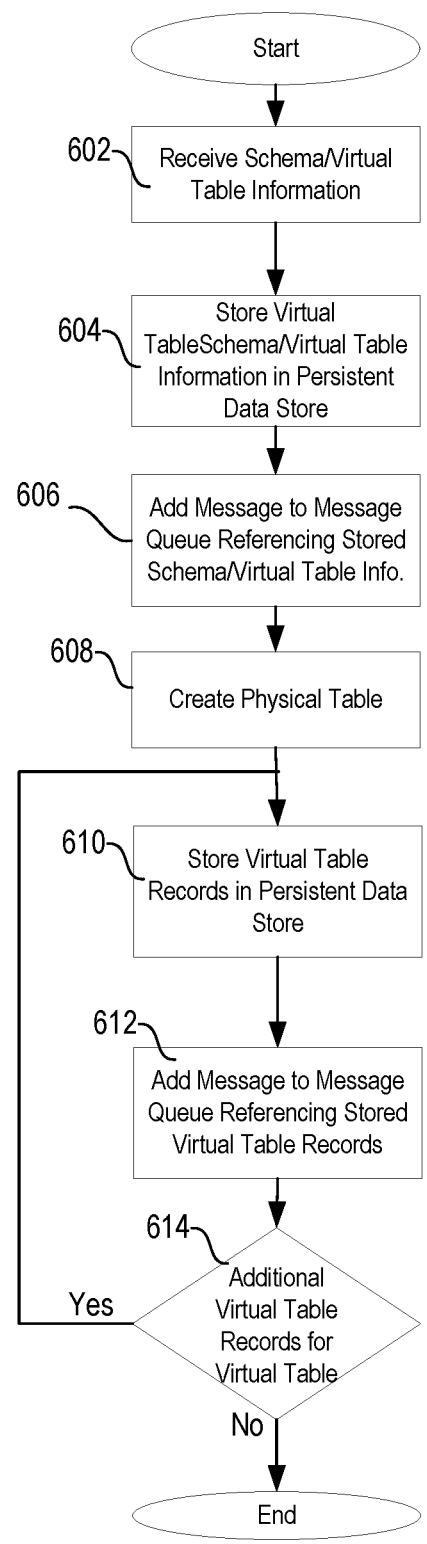
FIG. 6 is a flow chart illustrating one embodiment of processing virtual table packages received from the cloud connector.

FIG. 6 is a flow chart illustrating one embodiment of processing virtual table packages received from the cloud connector. In some embodiments, the method of FIG. 5 is implemented by a cloud server. According to an even more particular embodiment, the method of FIG. 5 is implemented by a message producer (e.g., producer 128, producer 302, or other producer).

At step 602, the producer receives a virtual table schema and other virtual table information, such as the mapping of virtual table fields to target data types, from the cloud connector. The producer stores the virtual table schema and the other virtual table information to a persistent storage (step 604) and adds a message referencing (e.g., pointing to) the stored schema and virtual table information to a message queue (step 606).

In some embodiments, the producer interacts with the cloud hosted database (e.g., cloud hosted database 106, cloud hosted data sources 326) to create a physical table according to the schema and additional virtual table information (step 608). In the case of a memory corruption issue, the physical table can make recovery faster and easier. According to one embodiment, creating the physical table comprises creating a physical table with a name that matches or is based on the virtual table name in the table schema information. Creating the physical table further comprises creating a column (physical table field) in the physical table for each virtual table field specified in the schema. According to one embodiment, each column in the physical tables has a corresponding virtual table field in the virtual table upon which it is based. Further, each column of the physical table has a name that matches or is based on the name of that column's corresponding virtual table field. Moreover, each physical table field is of the data type to which the corresponding virtual table field maps in the mapping of virtual table fields to target data types.

If the virtual table package includes virtual table records, the producer stores the virtual table records in the persistent data store (step 610) and adds a message to the message queue referencing (e.g., pointing to) the stored virtual table records (step 612). As the producer receives additional virtual table records, the producer repeats steps 610 and 612 (as indicated by step 614).

FIG. 6 is merely an illustrative example, and the disclosed subject matter is not limited to the ordering or number of steps illustrated. Embodiments may implement additional steps or alternative steps, omit steps, or repeat steps.

Figure 7:
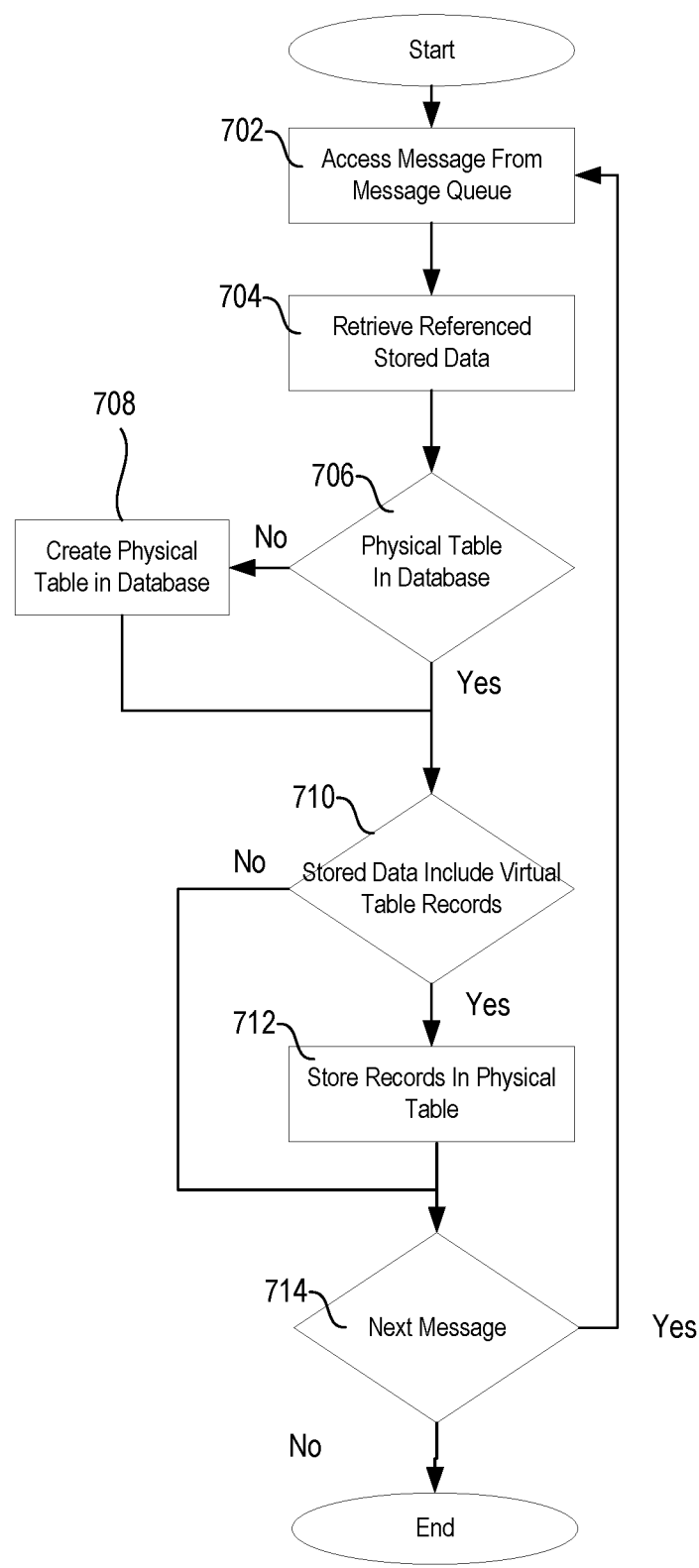
FIG. 7 is a flow chart illustrating one embodiment of processing messages from a message queue.

FIG. 7 is a flow chart illustrating one embodiment of processing messages from a message queue. In some embodiments, the method of FIG. 7 is implemented by a cloud server. According to an even more particular embodiment, the method of FIG. 7 is implemented by a message consumer (e.g., consumer 134, consumer 316, or other consumer).

The consumer, at step 702, dequeues a message from the message queue (e.g., message queue 130, message queue 314) and uses the reference to stored virtual table data to retrieve the stored virtual table data (step 704). If the referenced stored data includes a schema for a virtual table, the consumer determines if the physical table corresponding to the virtual table exists in the database (step 706). For example, the consumer determines if a physical table having the same name as the virtual table exists in the cloud hosted database. If the physical table does not exist in the cloud hosted database, the consumer interacts with the database to create the physical table (step 708).

At step 708, the consumer interacts with the cloud hosted database (e.g., cloud hosted database 106, cloud hosted data sources 326) to create a physical table according to the schema and additional virtual table information. According to one embodiment, creating the physical table comprises creating a physical table with a name that matches or is based on the virtual table name in the table schema information. Creating the physical table further comprises creating a column (physical table field) in the physical table for each virtual table field specified in the schema. According to one embodiment, each column in the physical tables has a corresponding virtual table field in the virtual table upon which it is based. Further, each column of the physical table has a name that matches or is based on the name of that column's corresponding virtual table field. Moreover, each physical table field is of the data type to which the corresponding virtual table field maps in the mapping of virtual table fields to target data types.

If the referenced stored data includes table records (e.g., as determined at step 710), the consumer interacts with the cloud hosted database to add the virtual table records to the physical table (step 712). The values from virtual table fields are stored to the corresponding physical table field according to the mapped data types.

As indicated by step 714, the consumer can continue to consume messages from the message queue (e.g., on FIFO basis or according to another queue management scheme) and process the messages to create new physical tables and add records to existing physical tables.

FIG. 7 is merely an illustrative example, and the disclosed subject matter is not limited to the ordering or number of steps illustrated. Embodiments may implement additional steps or alternative steps, omit steps, or repeat steps.

Figure 8:
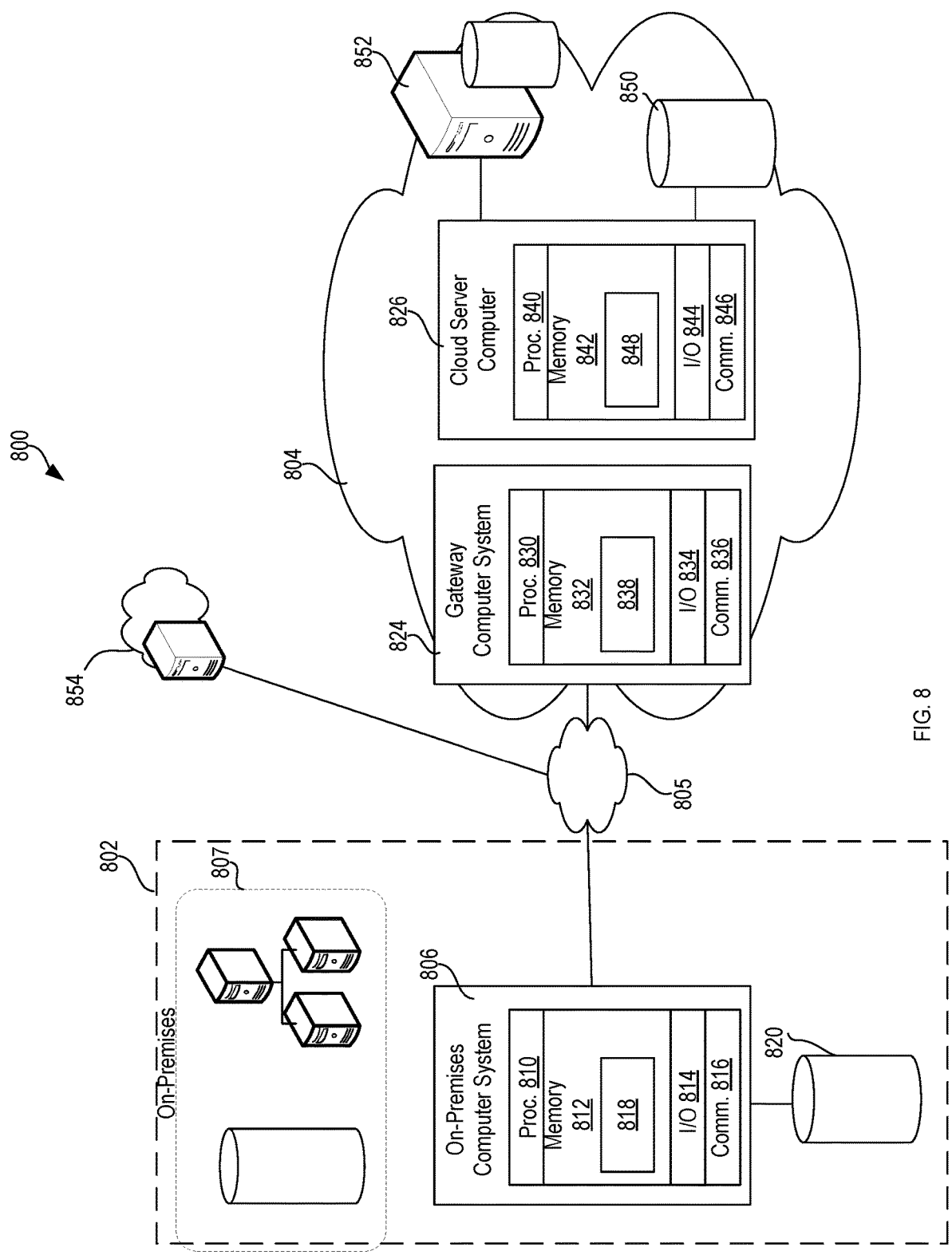
FIG. 8 is a diagrammatic representation of a distributed computer environment.

FIG. 8 depicts a diagrammatic representation of a distributed network computing environment where embodiments disclosed herein can be implemented. In the example illustrated, network computing environment 800 includes an on-prem environment 802 coupled to a cloud environment 804 over a network (e.g., the internet).

On-prem environment 802 includes computer systems, software, and data storage on the premises of an organization. In the illustrated embodiment, on-prem environment 802 includes an on-prem computer system 806 coupled to a plurality of on-prem data sources 807. On-prem computer system 806 comprises a computer processor 810 and associated memory 812. Computer processor 810 may be an integrated circuit for processing instructions, such as, but not limited to a central processing unit (CPU). Memory 812 may include volatile memory, non-volatile memory, semi-volatile memory or a combination thereof. Memory 812, for example, may include RAM, ROM, flash memory, a hard disk drive, a solid-state drive, an optical storage medium (e.g., CD-ROM), or other computer readable memory or combination thereof. Memory 812 implements a storage hierarchy that includes cache memory, primary memory or secondary memory. In some embodiments, memory 812 may include storage space on a data storage array. On-prem computer system 806 may also include input/output ("I/O") devices 814, such as a keyboard, monitor, printer, electronic pointing device (e.g., mouse, trackball, stylus, etc.), or the like, and a communication interface 816, such as a network interface card, to interface with network 805.

According to one embodiment, on-prem computer system 806 includes executable instructions 818 stored on a non-transitory computer readable medium coupled to computer processor 810. The computer executable instructions of on-prem computer system 802 are executable to provide a replication system (such as integration system 112 or other replication system), a transformation engine (e.g., transformation engine 115, transformation engine 200, or other transformation engine), or a cloud connector (e.g., cloud connector 120, cloud connector 202, or another cloud connector). One or more components of on-prem computer system 802 may use a database 820, which may be a portion of memory 812 or may be provided over a network by a database node. In some embodiments, database 820 is used as a metadata database.

Cloud environment 804 includes a gateway computer system 824 coupled to a cloud server computer system 826, which are coupled by a network. Gateway computer system 824 comprises a computer processor 830 and associated memory 832. Computer processor 830 may be an integrated circuit for processing instructions, such as, but not limited to a CPU. Memory 832 may include volatile memory, non-volatile memory, semi-volatile memory or a combination thereof. Memory 832, for example, may include RAM, ROM, flash memory, a hard disk drive, a solid-state drive, an optical storage medium (e.g., CD-ROM), or other computer readable memory or combination thereof. Memory 832 implements a storage hierarchy that includes cache memory, primary memory or secondary memory. In some embodiments, memory 832 may include storage space on a data storage array. Gateway computer system 824 may also include input/output I/O devices 834, such as a keyboard, monitor, printer, electronic pointing device (e.g., mouse, trackball, stylus, etc.), or the like, and a communication interface 836, such as a network interface card, to interface with network 805.

According to one embodiment, gateway computer system 824 includes executable instructions 838 stored on a non-transitory computer readable medium coupled to computer processor 830. The computer executable instructions of gateway computer system 824 are executable to provide an API gateway.

Cloud server computer system 826 comprises a computer processor 840 and associated memory 842. Computer processor 840 may be an integrated circuit for processing instructions, such as, but not limited to a CPU. Memory 842 may include volatile memory, non-volatile memory, semi-volatile memory or a combination thereof. Memory 842, for example, may include RAM, ROM, flash memory, a hard disk drive, a solid-state drive, an optical storage medium (e.g., CD-ROM), or other computer readable memory or combination thereof. Memory 832 implements a storage hierarchy that includes cache memory, primary memory or secondary memory. In some embodiments, memory 842 may include storage space on a data storage array. Cloud server computer system 826 may also include input/output I/O devices 844, such as a keyboard, monitor, printer, electronic pointing device (e.g., mouse, trackball, stylus, etc.), or the like, and a communication interface 846, such as a network interface card, to interface with network 805. According to one embodiment, cloud server computer system 826 includes executable instructions 848 stored on a non-transitory computer readable medium coupled to computer processor 840. The computer executable instructions of cloud server computer system 826 are executable to provide a cloud server (e.g., cloud server 126, cloud server 300, or other cloud server).

Cloud server computer system 826 includes or is connected to a cloud hosted database 850, which may be a portion of memory 812 or may be provided over a network by a database node. Cloud environment 804 includes a cloud hosted database to which data from on-prem environment 802 is replicated. The data from cloud hosted database 850 may be accessed and used by a variety of cloud services, including cloud services hosted on servers 852 in cloud environment 804 or services by third party provider systems 854. Thus, in some embodiments, the cloud hosted database may act as a staging database for cloud services.

For the purpose of illustration, a single system is shown for each of on-prem computer system 806, gateway computer system 824, cloud server computer system 826 and other computers systems. However, each of the computer systems may comprise a plurality of computers (not shown) interconnected to each other over a network.

Portions of the methods described herein may be implemented in suitable software code that may reside within RAM, ROM, a hard drive or other non-transitory storage medium. Alternatively, the instructions may be stored as software code elements on a data storage array, magnetic tape, floppy diskette, optical storage device, or other appropriate data processing system readable medium or storage device.

Although the invention has been described with respect to specific embodiments thereof, these embodiments are merely illustrative, and not restrictive of the invention as a whole. Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention.

Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Software implementing embodiments disclosed herein may be implemented in suitable computer-executable instructions that may reside on a computer-readable storage medium. Within this disclosure, the term "computer-readable storage medium" encompasses all types of data storage medium that can be read by a processor. Examples of computer-readable storage media can include, but are not limited to, volatile and non-volatile computer memories and storage devices such as random-access memories, read-only memories, hard drives, data cartridges, direct access storage device arrays, magnetic tapes, floppy diskettes, flash memory drives, optical data storage devices, compact-disc read-only memories, hosted or cloud-based storage, and other appropriate computer memories and data storage devices.

Those skilled in the relevant art will appreciate that the invention can be implemented or practiced with other computer system configurations including, without limitation, multi-processor systems, network devices, mini-computers, mainframe computers, data processors, and the like. The invention can be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks).

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention. At least portions of the functionalities or processes described herein can be implemented in suitable computer-executable instructions. The computer-executable instructions may reside on a computer readable medium, hardware circuitry or the like, or any combination thereof.

Any suitable programming language can be used to implement the routines, methods or programs of embodiments of the invention described herein, including C, C++, Java, JavaScript, HTML, or any other programming or scripting code, etc. Different programming techniques can be employed such as procedural or object oriented. Other software/hardware/network architectures may be used. Communications between computers implementing embodiments can be accomplished using any electronic, optical, radio frequency signals, or other suitable methods and tools of communication in compliance with known network protocols.

As one skilled in the art can appreciate, a computer program product implementing an embodiment disclosed herein may comprise a non-transitory computer readable medium storing computer instructions executable by one or more processors in a computing environment. The computer readable medium can be, by way of example only but not by limitation, an electronic, magnetic, optical or other machine readable medium. Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices.

Particular routines can execute on a single processor or multiple processors. Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. Functions, routines, methods, steps and operations described herein can be performed in hardware, software, firmware or any combination thereof.

It will also be appreciated that one or more of the elements depicted in the drawings/figures can be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only to those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein and throughout the meaning of "in" includes "in" and "on" unless the context clearly dictates otherwise.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Generally then, although the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

What is claimed is:

1. A method for cloud replication of data, the method comprising:
    in a first computing environment:
        accessing a virtual table definition and a data collection definition, the virtual table definition comprising a definition of a set of virtual table fields and a mapping of the set of virtual table fields to a set of target data types, and the data collection definition defining data of interest;
        automatically creating a virtual table according to the virtual table definition, the virtual table comprising the set of virtual table fields populated with the data of interest according to the data collection definition; and
        sending the virtual table and the mapping of the set of virtual table fields to the set of target data types over an internet from the first computing environment to a cloud computing environment, wherein the virtual table is sent to the cloud computing environment using a format that has a first set of valid data types, wherein a cloud hosted database has a second set of valid data types, wherein the virtual table includes a first virtual table field that has a first virtual field data type selected from the first set of valid data types supported by the format but not included in the second set of valid data types, wherein the first virtual table field is from the set of virtual table fields; and
    in the cloud computing environment, storing the set of virtual table fields as a set of physical table fields in a physical table in the cloud hosted database of the cloud computing environment, the set of physical table fields having the set of target data types.

2. The method of claim 1, wherein the data of interest comprises data from a plurality of heterogeneous data sources transformed by a transformation engine.

3. The method of claim 1, wherein the first virtual table field for holding a character string representing metadata of a respective file and a second virtual table field for holding the respective file as a binary string.

4. The method of claim 1, wherein sending the virtual table over the internet from the first computing environment to the cloud computing environment comprises sending a text-based representation of the virtual table and the mapping of the set of virtual table fields to the set of target data types.

5. The method of claim 4, wherein the mapping of the set of virtual table fields to the set of target data types maps the first virtual table field to a first target data type that is in the second set of valid data types but not the first set of valid data types, and wherein the first virtual table field is stored to the physical table, according to the mapping of the set of virtual table fields to the set of target data types, as a first physical table field having the first target data type.

6. The method of claim 1, further comprising repeating a set of operations to store the virtual table in the cloud hosted database as the physical table, the set of operations comprising:
receiving a portion of the virtual table at the cloud computing environment;
storing the portion of the virtual table in a persistent storage location in the cloud computing environment;
producing a message to a message queue in the cloud computing environment, the message including a reference to the portion of the virtual table stored at the persistent storage location;
consuming the message from the message queue;
based on the message consumed from the message queue, retrieving the portion of the virtual table from the persistent storage location; and
storing the portion of the virtual table as a portion of the physical table.

7. The method of claim 1, wherein the cloud hosted database is a staging database for a cloud service.

8. The method of claim 1, further comprising performing bi-directional replication of the data of interest.

9. A data replication system for replicating data to a cloud, the data replication system comprising:
an on-premises computer system connected to an internet, the on-premises computer system comprising:
a first computer processor;
a first non-transitory computer readable storage medium storing a set of on-premises computer instructions executable by the first computer processor and comprising instructions for:
accessing a virtual table definition and a data collection definition, the virtual table definition comprising a definition of a set of virtual table fields and a mapping of the set of virtual table fields to a set of target data types, and the data collection definition defining data of interest;
automatically creating a virtual table according to the virtual table definition, the virtual table comprising the set of virtual table fields populated with the data of interest; and
sending the virtual table and the mapping of the set of virtual table fields to a set of target data types over the internet; and
a cloud hosted database;
a cloud computer system connected to the internet and the cloud hosted database, wherein the virtual table is sent to the cloud computer system using a format that has a first set of valid data types, wherein the cloud hosted database has a second set of valid data types, wherein the virtual table includes a first virtual table field that has a first virtual field data type selected from the first set of valid data types supported by the format but not included in the second set of valid data types, wherein the first virtual table field is from the set of virtual table fields, the cloud computer system comprising:
a second computer processor;
a second non-transitory computer readable storage medium storing a set of cloud computer instructions executable by the second computer processor and comprising instructions for:
receiving the virtual table over the internet; and
storing the set of virtual table fields as a set of physical table fields in a physical table in the cloud hosted database, the set of physical table fields having the set of target data types.

10. The data replication system of claim 9, wherein the data of interest comprises data from a plurality of heterogeneous data sources transformed by a transformation engine.

11. The data replication system of claim 9, wherein the first virtual table field for holding a character string representing metadata of a respective file and a second virtual table field for holding the respective file as a binary string.

12. The data replication system of claim 9, wherein sending the virtual table over the internet comprises sending a text-based representation of the virtual table and the mapping of the set of virtual table fields to the set of target data types to the cloud computer system.

13. The data replication system of claim 12, wherein the mapping of the set of virtual table fields to the set of target data types maps the first virtual table field to a first target data type that is in the second set of valid data types but not the first set of valid data types, and wherein the first virtual table field is stored to the physical table, according to the mapping of the set of virtual table fields to the set of target data types, as a first physical table field having the first target data type.

14. The data replication system of claim 9, wherein the set of cloud computer instructions comprise instructions executable to repeat a set of operations to store the virtual table in the cloud hosted database as the physical table, the set of operations comprising:
receiving a portion of the virtual table;
storing the portion of the virtual table in a persistent storage location;
producing a message to a message queue, the message including a reference to the portion of the virtual table stored at the persistent storage location;
consuming the message from the message queue;
based on the message consumed from the message queue, retrieving the portion of the virtual table from the persistent storage location; and
storing the portion of the virtual table as a portion of the physical table.

15. The data replication system of claim 9, wherein the set of on-premises computer instructions and the set of cloud computer instructions comprise instructions for performing bi-directional replication of data between the on-premises computer system and the cloud computer system.

16. The data replication system of claim 9, wherein the cloud hosted database is a staging database for a cloud service.

17. The data replication system of claim 16, wherein the set of on-premises computer instructions comprises instructions for collecting the data of interest from the cloud service to perform circular replication of the data of interest.

18. A computer program product comprising a non-transitory, computer-readable medium storing thereon a set of on-premises computer instructions executable by a processor, the set of on-premises computer instructions comprising instructions for:
accessing a virtual table definition and a data collection definition, the virtual table definition comprising a definition of a set of virtual table fields and a mapping of the set of virtual table fields to a set of target data types, and the data collection definition defining data of interest;

automatically creating a virtual table according to the virtual table definition, the virtual table comprising the set of virtual table fields populated with the data of interest according to the data collection definition; and sending the virtual table and the mapping of the set of virtual table fields to target data types over an internet to a cloud computing environment for storage of the set of virtual table fields in a physical table as a set of physical table fields having the set of target data types in a cloud hosted database, wherein the virtual table is sent to the cloud computing environment using a format that has a first set of valid data types, wherein the cloud hosted database has a second set of valid data types, wherein the virtual table includes a first virtual table field that has a first virtual field data type selected from the first set of valid data types supported by the format but not included in the second set of valid data types, wherein the first virtual table field is from the set of virtual table fields.

19. The computer program product of claim 18, wherein the data of interest comprises data from a plurality of heterogeneous data sources transformed by a transformation engine.

20. The computer program product of claim 18, wherein the first virtual table field for holding a character string representing metadata of a respective file and a second virtual table field for holding the respective file as a binary string.

21. The computer program product of claim 18, wherein sending the virtual table over the internet to the cloud computing environment comprises sending a text-based representation of the virtual table and the mapping of the set of virtual table fields to the set of target data types.

22. The computer program product of claim 21, wherein the mapping of the set of virtual table fields to the set of target data types maps the first virtual table field to a first target data type that is in the second set of valid data types but not the first set of valid data types, and wherein the first virtual table field is stored to the physical table, according to the mapping of the set of virtual table fields to the set of target data types, as a first physical table field having the first target data type.

* * * * *